UNITED STATES PATENT OFFICE.

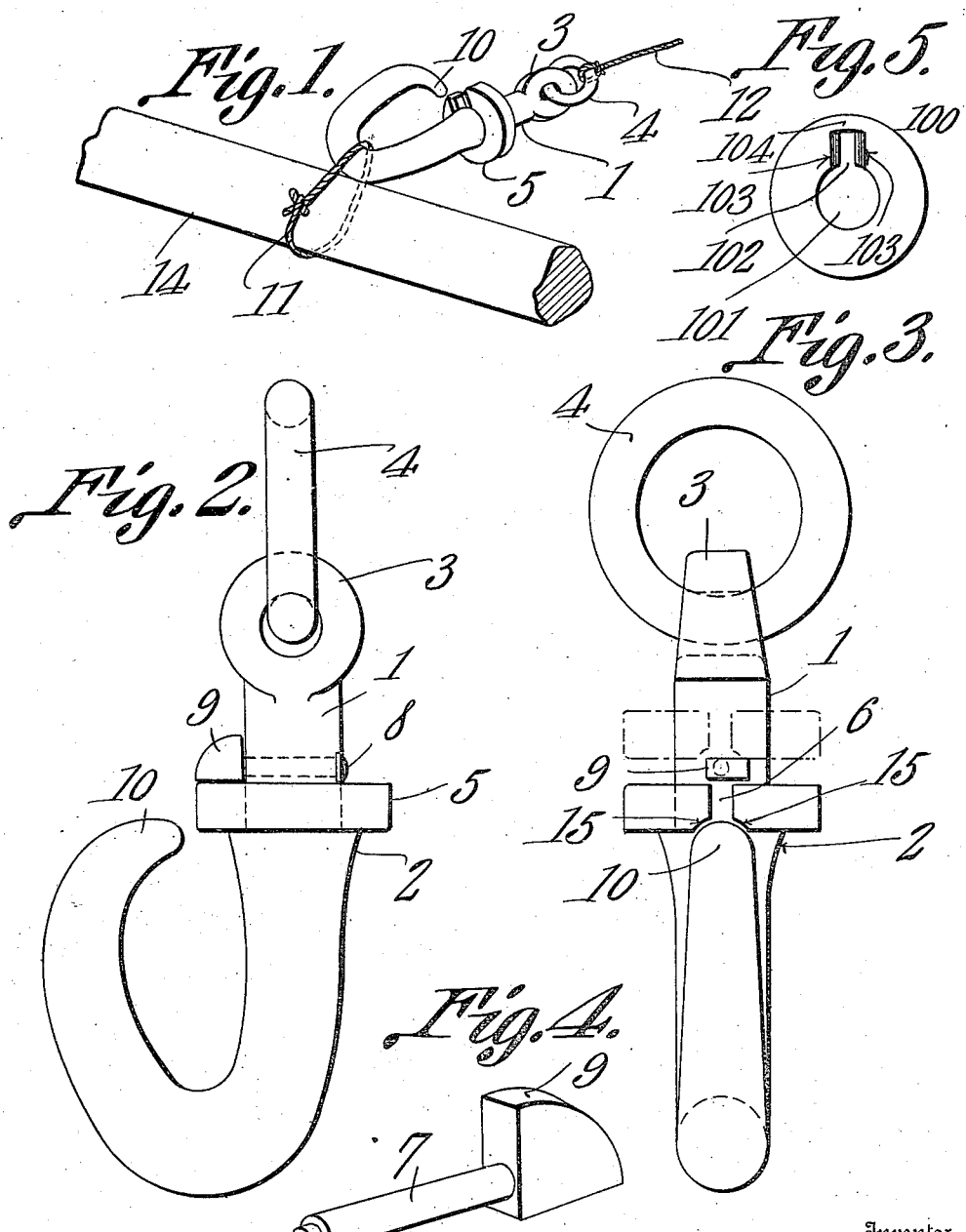

LOUIS S. DENISON, OF KELSO, WASHINGTON.

BUTT-HOOK.

987,865. Specification of Letters Patent. Patented Mar. 28, 1911.

Application filed March 24, 1910. Serial No. 551,329.

*To all whom it may concern:*

Be it known that I, LOUIS S. DENISON, a citizen of the United States, residing at Kelso, in the county of Cowlitz and State of Washington, have invented a new and useful Butt-Hook, of which the following is a specification.

The device forming the subject matter of this application is the structure commonly known as a butt hook, employed in logging and similar operations, among other things, for the purpose of engaging the choke line which encircles the log.

It is the object of this invention to provide a butt hook having a movable member which may be locked in position adjacent to point of the hook, to maintain the choke line within the contour of the hook.

Another object of the invention is to provide a butt hook of novel and improved form; to provide a novel reciprocating element adapted to be locked in position upon the hook; and to provide novel means for locking the reciprocating member in place.
With the above and other objects in view, the invention consists in the novel construction and arrangement of parts hereinafter described, delineated in the drawings, and specifically claimed, it being understood, that, within the scope of what is claimed, divers changes in the form, proportions, size, and minor details of the structure may be made, without departing from the spirit of the invention or sacrificing any of the advantages thereof.

Similar numerals of reference are employed to denote corresponding parts throughout the several figures of the drawings.
In the accompanying drawings, Figure 1 is a perspective showing the hook in operation; Fig. 2 is a side elevation; Fig. 3 is an edge elevation; Fig. 4 is a detail perspective of the stop; and Fig. 5 is a bottom plan of a modified form of ring.

The invention includes as a primary and fundamental element, a hook, upon the shank 1 of which, there is a circumscribing shoulder 2, located approximately opposite to the point 10 of the hook. At the end of the shank 1 there is a head 3 in which is mounted a ring 4.

The shank 1 of the hook is embraced by a split ring 5, having an opening 6 between its ends. This split ring 5 is free to rotate upon the shank 1, and to slide thereon between the shoulder 2 and the head 3.

A shouldered stop is provided, the shank 7 of which is inserted radially to the portion 1 of the hook, between the shoulder 2 and the head 3, and relatively near to the shoulder 2. This shank 7 may be extended entirely through the portion 1 of the hook and retained by means of a bur and washer 8, or other like means, adapted to retain the shank 7 within the portion 1 of the hook for rotation therein. Upon the exposed end of the shank 7 of the stop, there is a transverse head 9 constituting the shouldered portion of the stop, this shouldered portion being of unequal transverse dimensions. The dimensions of this head are such that when the head is disposed longitudinally from the shank 1 of the hook, the head will pass readily through the opening 6 in the split ring 5, when the said ring is reciprocated between the head 3 and the shoulder 2. If, however, the head 9 is disposed transversely of the shank 1 of the hook, a portion of the head will extend upon either side of the opening 6 in the split ring 5, thus preventing the head 9 from entering the opening 6, the stop thus becoming effective as a means for engaging the ring 5, to hold the same against reciprocation upon the shank 1 of the hook.

The device is capable of a wide application. It may be operated as shown in Fig. 1 of the drawing, wherein the choke line 11, having been passed about the log 14, is made to engage the hook. The head 9 of the stop is then disposed longitudinally of the shank 1, and the ring 5 is slid into contact with the shoulder 2, the head, when positioned as above pointed out, moving readily through the opening 6 in the split ring 5. When the ring 5 has been disposed upon the shoulder 2, the stop is rotated, so that its head 9 will extend transversely of the shank, and upon either side of the opening 6 in the ring 5, thus retaining the ring 5 upon the shoulder 2, the ring when thus positioned, obviously preventing the choke line 11 from slipping over the point 10 of the hook. It is with the ring 4, that the draw line 12 is connected in practical operation.

It will be seen that it is not absolutely necessary, in order to maintain the ring 5 upon the shoulder 2, that the stop be rotated so as to dispose its head 9 transversely of the shank 1. For instance, after the ring 5 has been brought into contact with the shoulder 2, the head 9 of the stop being disposed longitudinally of the shank 1, the ring 5 may be rotated upon the shank 1 so that the opening 6 in the ring 5 will be out of alinement with the head 9 of the stop. Under such circumstances, the ring 5 will obviously be held against the shoulder 2. The foregoing arrangement takes place when a merely temporary restraining of the choke line 11 within the contour of the hook is desired, the rotation of the head 9 to position the same transversely of the shank 1, being the more secure and more satisfactory operation.

In cases where it is not desired to hold the choke line 11 within the hook, the ring 5 may be slid into the vicinity of the head 3, and when the head 9 of the stop is turned transversely of the shank 1, the ring 5 will obviously be held between the stop and the head 3, in a position remote from the point 10 of the hook, so that the choke line 11 may be inserted into the contour of the hook and withdrawn therefrom at the will of the operator, the device under such circumstances, exercising merely the functions of an ordinary hook.

Sometimes, in order to facilitate the sliding of the ring 5 over the head 9 of the stop, without accurately alining the opening 6 in the ring 5 with the said head 9, I bevel the end faces of the split ring, adjacent the lower surface of the ring, as shown at 15, the bevels at 15 obviously serving to guide the ring over the head 9 of the stop when the ring is moved toward the shoulder 2.

Sometimes I employ a solid ring, of the form shown in Fig. 5, instead of the split ring shown in the preceding figures. This ring, denoted generally by the numeral 100, has an axial opening 101 for the reception of the shank 1 of the hook. Extended outwardly from this opening 101, is a radially disposed slot 102, the slot 102 having the functions attributable to the opening 6 of the preceding figures. Opposite edges of the slot 102 are beveled, as shown at 103, to correspond to the bevel 15, seen most clearly in Fig. 3. As shown at 104, the periphery of the ring 100 is left intact across the end of the slot 102. It will be seen that a ring of the sort denoted by the numeral 100 may, at the pleasure of the manufacturer, replace the ring 5 of the preceding figures, without in any way altering the operation of the device.

Having thus described the invention, what is claimed is:—

A device of the class described comprising a hook provided with a shoulder; a stop radially mounted for rotation in the hook; and a ring slidable upon the hook and arranged to rest upon the shoulder to close the mouth of the hook; the stop being of unequal transverse dimensions, and the ring having an opening which is wider than the smaller transverse dimension of the stop, and narrower than the larger transverse dimension of the stop whereby the stop may be rotated to bridge the opening and to hold the ring upon the shoulder.

In testimony that I claim the foregoing as my own, I have hereto affixed my signature in the presence of two witnesses.

LOUIS S. DENISON.

Witnesses:
GEO. F. PLAMONDON,
E. A. KNIGHT.

---

Copies of this patent may be obtained for five cents each, by addressing the "Commissioner of Patents, Washington, D. C."